United States Patent
Jocham

(10) Patent No.: US 7,419,228 B2
(45) Date of Patent: Sep. 2, 2008

(54) HYDRAULIC UNIT FOR ANTI-LOCK AUTOMOBILE BRAKE SYSTEMS AND METHOD FOR PRODUCING THE SAME

(75) Inventor: Reinhold Jocham, Hechingen (DE)

(73) Assignee: Robert Bosch GmbH, Stuttgart (DE)

( * ) Notice: Subject to any disclaimer, the term of this patent is extended or adjusted under 35 U.S.C. 154(b) by 872 days.

(21) Appl. No.: 10/470,344

(22) PCT Filed: Feb. 1, 2002

(86) PCT No.: PCT/DE02/00368

§ 371 (c)(1),
(2), (4) Date: Jan. 30, 2004

(87) PCT Pub. No.: WO02/062641

PCT Pub. Date: Aug. 15, 2002

(65) Prior Publication Data

US 2004/0135428 A1    Jul. 15, 2004

(30) Foreign Application Priority Data

Feb. 3, 2001    (DE) ................................ 101 04 875

(51) Int. Cl.
*B60T 8/36* (2006.01)
(52) U.S. Cl. .................................................. 303/119.3
(58) Field of Classification Search .......... 303/DIG. 10, 303/119.1, 119.2, 119.3
See application file for complete search history.

(56) References Cited

U.S. PATENT DOCUMENTS

| | | | | |
|---|---|---|---|---|
| 4,626,045 A | * | 12/1986 | Takei et al. ............... | 303/119.3 |
| 5,441,233 A | * | 8/1995 | Asou et al. ............. | 251/129.15 |
| 5,482,362 A | * | 1/1996 | Robinson ................. | 303/119.2 |
| 5,681,097 A | * | 10/1997 | Tackett et al. ............ | 303/119.2 |
| 5,779,221 A | * | 7/1998 | Staib et al. ............. | 251/129.15 |
| 5,842,753 A | * | 12/1998 | Staib et al. ............... | 303/119.3 |
| 5,887,624 A | | 3/1999 | Taniguchi | |
| 6,000,679 A | * | 12/1999 | Reuter et al. ........... | 251/129.15 |
| 6,048,041 A | * | 4/2000 | Mueller et al. ........... | 303/119.2 |
| 6,120,114 A | * | 9/2000 | Blazic et al. ............. | 303/119.2 |
| 6,186,603 B1 | * | 2/2001 | Park ........................ | 303/119.3 |

(Continued)

FOREIGN PATENT DOCUMENTS

DE    195 29 550 A1    2/1997

(Continued)

*Primary Examiner*—Robert A. Siconolfi
(74) *Attorney, Agent, or Firm*—Ronald E. Greigg

(57) ABSTRACT

A hydraulic assembly for slip-controlled brake systems of motor vehicles, having a valve block with receiving bores, each for a hydraulic part of electromagnetically actuated valves, each of which contains magnetically active elements and a respective electric part having an electric coil encompassing the valve dome, a coil housing, and a washer that is contained at least indirectly in the coil housing, on the side oriented toward the hydraulic part. The washers of at least some of the valves are interconnected to form a multi-washer component. The production of the hydraulic assembly then includes the production of a structural unit, which supports the respective electric parts of at least some of the valves, by connecting the coil housing to the associated washers of the multi-washer component, and the placement of this structural unit onto the valve block by introducing the valve domes into through openings of the washers.

16 Claims, 2 Drawing Sheets

U.S. PATENT DOCUMENTS

| | | | |
|---|---|---|---|
| 6,352,317 B1 * | 3/2002 | Blazic et al. | 303/119.2 |
| 6,655,411 B2 * | 12/2003 | Sato et al. | 137/625.65 |
| 2005/0006951 A1 * | 1/2005 | Schwarzer et al. | 303/119.2 |

FOREIGN PATENT DOCUMENTS

| | | |
|---|---|---|
| DE | 195 35 235 A1 | 3/1997 |
| DE | 196 40 261 A1 | 4/1998 |
| DE | 197 04 152 A1 | 8/1998 |
| DE | 198 59 488 A1 | 7/1999 |
| DE | 19859488 * | 7/1999 |

* cited by examiner

HYDRAULIC UNIT FOR ANTI-LOCK AUTOMOBILE BRAKE SYSTEMS AND METHOD FOR PRODUCING THE SAME

CROSS-REFERENCE TO RELATED APPLICATIONS

This application is a 35 USC 371 application of PCT/DE 02/00368 filed on Feb. 1, 2002.

BACKGROUND OF THE INVENTION

1 Field of the Invention

The invention is directed to an improved hydraulic assembly for slip-controlled brake systems of motor vehicles and to a method for its production.

2 Description of the Prior Art

A hydraulic assembly of the type with which this invention is concerned is known from EP 0 720 551 B1 and has a valve block with receiving bores, each for containing the hydraulic part of respective electromagnetically actuated valves, each of which contains magnetically active elements such as an armature and magnetic core of the valve dome that contains the hydraulic part and that protrudes in the extension of the receiving bore, up from a delimiting plane of the hydraulic block. The valves also each have an electric part, which is slid onto the valve dome, and have an electric coil that encompasses this valve dome, a coil housing, and a washer that is contained in the coil housing, on the side oriented toward the delimiting plane. The electric part is centered in relation to the hydraulic part of the valve, among other things by the washer being slid onto a bushing that is caulked into the receiving bore. Usually six or twelve coils are used for each hydraulic assembly; in order to assemble the electric part of the valves, the washers for each coil are individually press-fitted into a bottom opening of the associated coil housing, and then the coil housing and the coil together are slid onto the valve dome from above until the washer comes into contact with the bushing.

SUMMARY AND ADVANTAGES OF THE INVENTION

Because of the interconnected washers, when the hydraulic assembly according to the invention is assembled, first the coil housings that contain the coils are placed onto the associated washers and then the resulting electric portions of all of the valves that make up the hydraulic assembly are mounted as a single unit onto the valve block. In comparison to the prior method, this has the advantage of a shorter production time since it combines a number of similar production steps.

Advantageous modifications and improvements of the invention are possible by means of the measures taken in the dependent claims.

A particularly preferable modification of the invention provides that the washers are disposed next to one another, essentially in a plane, and are interconnected by bridge pieces, which in the assembled state, protrude through radial notches in the ends of the coil housings in such a way that the faces of the washers oriented toward the hydraulic part of the valves are flush with the end surface of the associated coil housing. Then the bottom surface of the multi-washer component that supports the coil housings constitutes a planar surface, which can come into flat contact with the likewise planar surface of the valve block, which results in an improved magnetic flux.

Another preferred embodiment provides that at least some of the bridge pieces are embodied as elastically and/or plastically deformable. This allows valve domes, which may have been installed into the valve block in positions that deviate from the perpendicular, to be tolerance compensated by virtue of the washers being oriented at angles to one another.

According to one modification, at least some of the bridge pieces have fastening elements such as screw eyelets or stop faces for hold-down elements or ribs that protrude from a control unit housing, which can be fastened to the valve block, and that are used for affixing the multi-washer component.

BRIEF DESCRIPTION OF THE DRAWINGS

An exemplary embodiment of the invention is described in detail herein below, in conjunction with the drawings, in which.

DESCRIPTION OF THE PREFERRED EMBODIMENT

Figure 1:
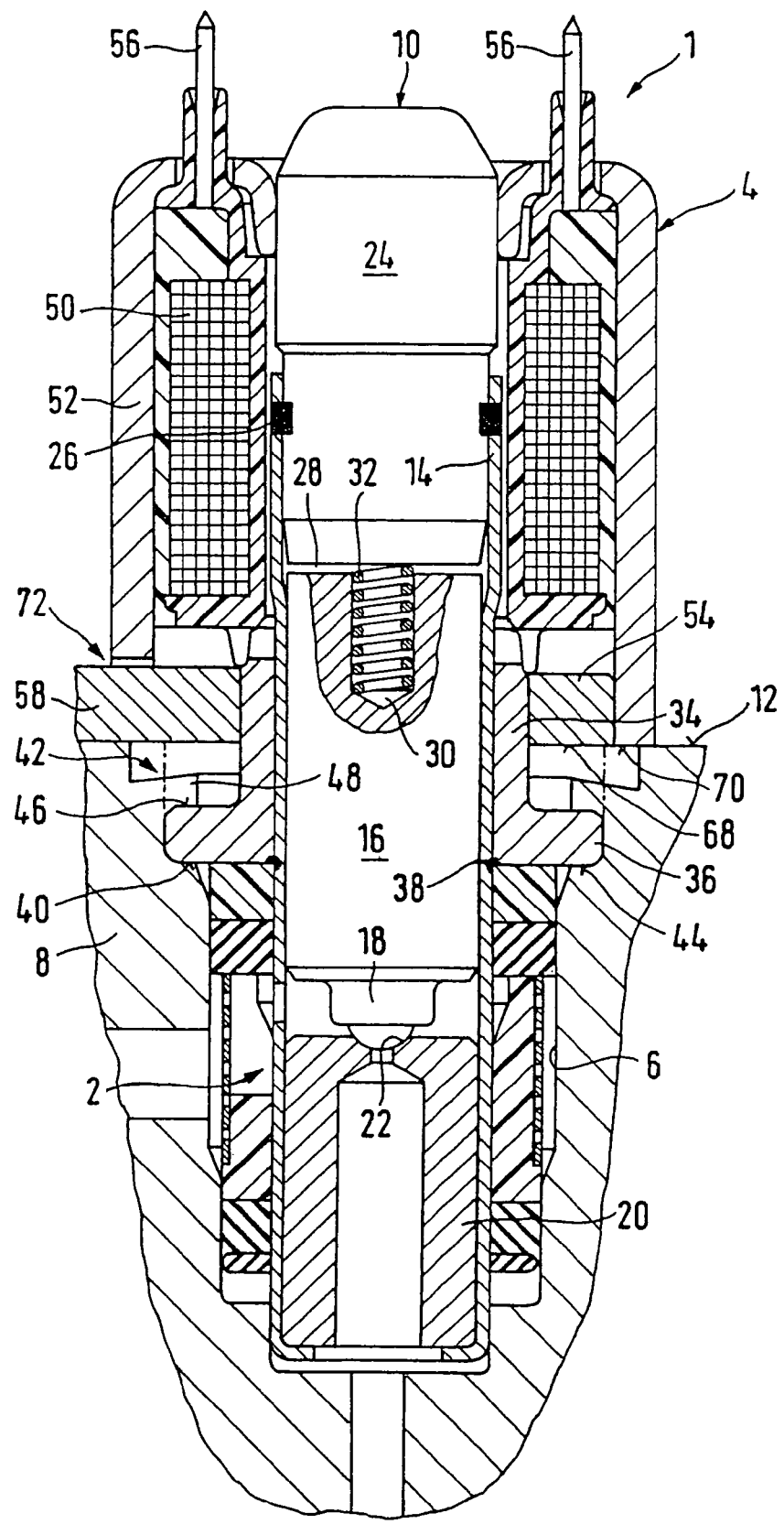
FIG. 1 shows a longitudinal section through an electromagnetically actuated valve that is closed when without current, which is part of a preferred embodiment of the hydraulic assembly according to the invention.

For scale reasons, FIG. 1 shows only one electromagnetically actuated valve 1 of a hydraulic assembly for slip-controlled brake systems of motor vehicles that includes a total of twelve such valves. The valve 1 is comprised of a hydraulic part 2 and an electric part 4. The hydraulic part 2 is received and fastened in a stepped receiving bore 6 of a valve block 8. In the extension of the receiving bore 6, a valve dome 10 of the hydraulic part 2 protrudes up from a delimiting plane 12 of the valve block 8. The electric part 4 is slid onto the valve dome 10.

The hydraulic part 2 contains a thin-walled cylindrical guide sleeve 14 inside of which an axially mobile armature 16 with a closing element 18 is guided. A valve body 20 is press-fitted into the bottom of the guide sleeve 14 and is provided with a valve seat 22 for the closing element 18. A magnetic core 24 is fastened into the opposite end of the guide sleeve 14 by means of welding 26, with a narrow air gap 28 left open on its side oriented toward the armature 16. A closing spring 32 that is supported against the magnetic core 24 is contained in a blind bore 30 of the armature 16.

A bushing 34 made of soft magnetic material is supported on the middle part of the guide sleeve 14 by means of a flange 36, and is fastened there for example by means of welding 38, the flange 36 being held in a bore step 40 of the receiving bore 6 by means of a caulk 42. A bottom surface 44 of the flange 36 rests against the bottom of the bore step 40, while the other surface 46 is overlapped by a material bead 48, which has been produced using material displaced from the wall of the bore. The caulk 42 secures the position of the hydraulic part 2 of the valve 1 in the valve block 8.

After the hydraulic part 2 is fastened into the valve block 8, the electric part 4 of the valve 1 is slid onto the valve dome 10 and has an electric coil 50, which encompasses this valve dome 10 in the vicinity of the magnetic core 24. The coil 50 is contained in a coil housing 52, the bottom of which has a washer 54 made of soft magnetic material press-fitted into it. Connecting pins 56 of the coil 50 protrude perpendicularly upward through the top wall of the coil housing 52. The coil housing 52 preferably encompasses the magnetic core 24 without play, and with the washer 54, encompasses the bushing 34 of the hydraulic part 2, and is thus centered on it.

When the coil 50 is without current, the closing spring 32 holds the closing element 18 in contact with the valve seat 22. When the coil 50 is excited, the bushing 34 as well as the magnetic core 24 and the coil housing 52, contributes to conducting the magnetic flux to the armature 16 of the hydraulic part 2. The magnetically active magnetic core 24 then generates magnetic forces that push the axially mobile armature 16 into the open position of the valve 1.

Figure 2:
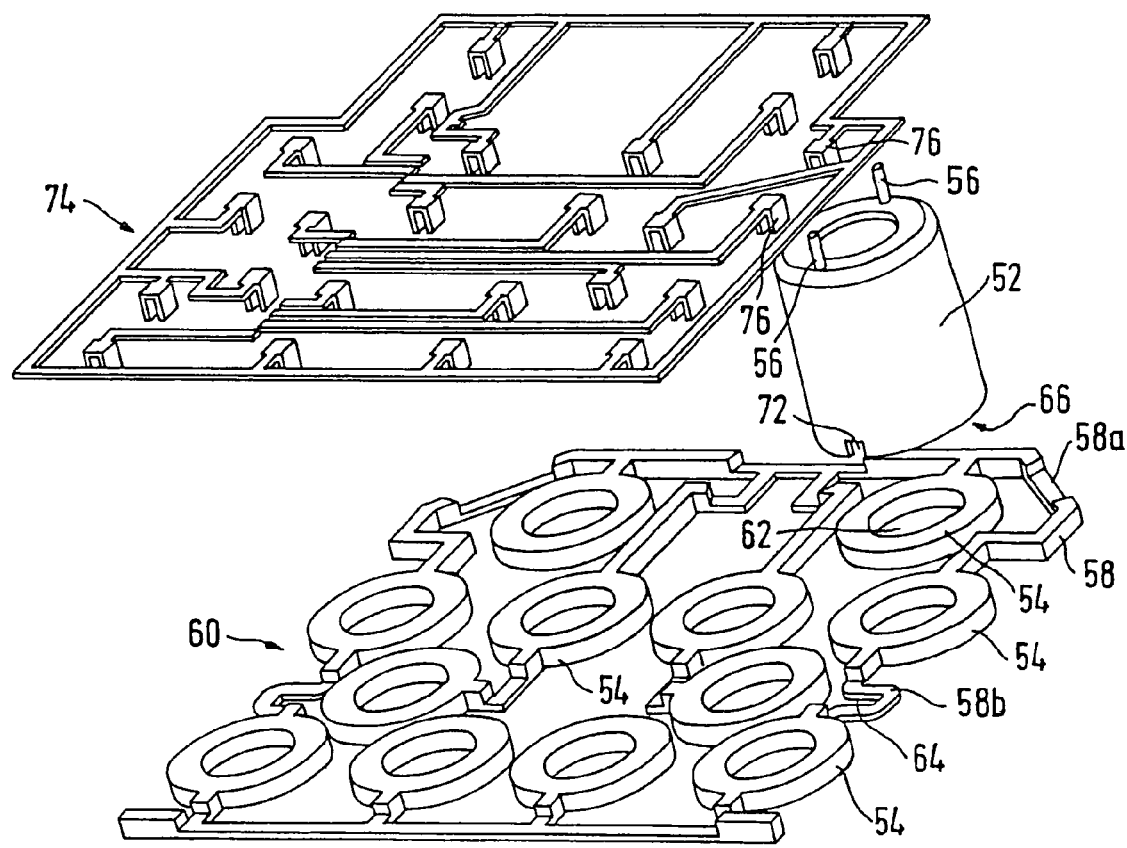
FIG. 2 shows a schematic depiction of a multi-washer component with a coil housing of the valve from FIG. 1, shortly before assembly.

FIG. 2 shows the coil housing 52 of the valve 1 in a state shortly before it is mounted onto the associated washer 54. Each of the twelve valves 1 of the hydraulic assembly is associated with such a washer 54; the washers 54 are disposed next to one another, essentially in a plane, and are interconnected by means of bridge pieces 58. The bridge pieces 58 and the washers 54 then combine to form a preferably one-piece, planar multi-washer component 60, which is comprised for example of a stamped sheet metal part and in which each washer 54 is connected to another washer 54 by means of at least one bridge piece 58. The position of the individual washers 54 within the multi-washer component 60 is selected so that central through openings 62 of the washers 54 can be axially aligned with the associated valve domes 10 protruding from the valve block 8.

The thickness of the bridge pieces 58 is preferably identical to the thickness of the washers 54. At least some of the bridge pieces 58a can be designed to be elastically and/or plastically deformable in order to permit tolerance compensation of valve domes 10, which may have been caulked into the valve block 8 in positions that deviate from the perpendicular. These bridge pieces 58a then have, for example, a reduced cross section on one side in comparison to the washers 54. In addition, at least some of the bridge pieces 58b can be provided with fastening elements such as screw eyelets 64 in order to fasten the multi-washer component 60 to the valve block 8. Alternatively or in addition to this, the bridge pieces can be provided with stop faces for hold-down elements or ribs that protrude from a control unit housing, not shown, and that are used for affixing the multi-washer component 60 in its installation position.

If the hydraulic part 2 of the valves 1 is already caulked into the associated receiving bore 6, then the coil housings 52 and the coils 50 are sequentially press-fitted with their bottom openings 66 onto the associated washers 54 of the multi-washer component 60 until a face 68 of each washer 54 oriented toward the hydraulic part 2 of the valve 1 is flush with the end surface 70 of the associated coil housing 52 so that the multi-washer component 60 has a planar bottom surface. In order to accomplish this, the ends of the coil housings 52 are provided with radial notches 72 whose cross sections correspond essentially to those of the bridge pieces 58 in the vicinity of the respective washers 54 and the bridge pieces 58 pass radially through these notches 72, as also shown in FIG. 1. Assembling these parts produces a structural unit comprised of the electric parts 4 of all of the valves 1 of the hydraulic assembly secured to the multi-washer component 60.

In a subsequent step, this structural unit is placed onto the valve block 8 from above by introducing the valve domes 10 protruding up from the valve block 8 into the through openings 62 of the associated washers 54; the washers 54 preferably engage with a press fit around the associated bushings 34 caulked into the receiving bores 6 and the multi-washer component 60 comes into contact with its planar bottom surface on the delimiting plane 12 of the valve block 8, as shown in FIG. 1.

Preferably, a sheet metal electric connecting grid 74, which can be connected to a current source, is provided to supply current to all of the coils 50 and is designed so that it can be placed onto the connecting pins 56 of the coils 50. To this end, shoes 76 with U-shaped cross sections that open toward the connecting pins 56 are provided at locations on the connecting grid 74 disposed opposite from the connecting pins 56; these shoes 76 embrace the connecting pins 56 and are welded to them. Alternatively, the individual connecting pins 56 can also be connected to one another and to a current source by means of pin-and-socket connecters. The assembled structural unit comprised of the multi-washer component 60 and the coil housings 52 is enclosed by a control unit housing, not shown, which can be fastened to the valve block 8. Ribs or hold-down elements can protrude from the control unit housing, toward the multi-washer component 60 and can exert pressure from above onto some of the bridge pieces 58, thus securing the multi-washer component 60 in position, together with the coil housings 52.

The foregoing relates to preferred exemplary embodiments of the invention, it being understood that other variants and embodiments thereof are possible within the spirit and scope of the invention, the latter being defined by the appended claims.

The invention claimed is:

1. In a hydraulic assembly for slip-controlled brake systems of motor vehicles, having a valve block (8) with receiving bores (6), each for a hydraulic part (2) of electromagnetically actuated valves (1), each of which contains magnetically active elements, such as an armature (16) and a magnetic core (24) of a valve dome (10) that contains the hydraulic part (2), and a respective electric part (4), which is slid onto the valve dome (10) and has an electric coil (50) encompassing this valve dome (10), a coil housing (52), and a washer (54) that is contained at least indirectly in the coil housing (52), on the side oriented toward the hydraulic part (2) which closes a magnet circuit from the magnetic core (24) to the armature (16) via the coil housing (52), the improvement wherein the washers (54) of at least some of the valves (1) are interconnected to form a multi-washer component (60), the washers (54) being disposed next to one another, essentially in a plane, and connected to one another by means of bridge pieces (58, 58a, 58b), wherein in the assembled state, the bridge pieces (58, 58a, 58b) protrude through radial notches (72) provided in ends of the coil housings (52) in such a way that faces (68) of the washers (54) oriented toward the hydraulic part (2) of the valves (1) are flush with an end surface (70) of the associated coil housing (52).

2. The hydraulic assembly according to claim 1, wherein each washer (54) is connected to another washer (54) by means of at least one bridge piece (58, 58a, 58b).

3. The hydraulic assembly according to claim 2, wherein the washers (54) and bridge pieces (58, 58a, 58b) constitute a preferably one-piece multi-washer component (60).

4. The hydraulic assembly according to claim 3, wherein at least some of the bridge pieces (58a) are embodied as elastically and/or plastically deformable.

5. The hydraulic assembly according to claim 2, wherein at least some of the bridge pieces (58a) are embodied as elastically and/or plastically deformable.

6. The hydraulic assembly according to claim 2, wherein at least some of the bridge pieces (58b) have fastening elements such as screw eyelets (64) or stop faces for hold-down elements or ribs that protrude from a control unit housing, which can be fastened to the valve block (8), and that are used for affixing the multi-washer component (60).

7. The hydraulic assembly according to claim 1, wherein the washers (54) and bridge pieces (58, 58a, 58b) constitute a preferably one-piece multi-washer component (60).

8. The hydraulic assembly according to claim 7, wherein at least some of the bridge pieces (58*a*) are embodied as elastically and/or plastically deformable.

9. The hydraulic assembly according to claim 8, further comprising connecting pins (56) disposed on the end surface of the coil housing (52) oriented away from the valve block (8), and a shared electric connecting grid (74) which can be placed onto the connecting pins (56) of the valves (1).

10. The hydraulic assembly according to claim 7, wherein at least some of the bridge pieces (58*b*) have fastening elements such as screw eyelets (64) or stop faces for hold-down elements or ribs that protrude from a control unit housing, which can be fastened to the valve block (8), and that are used for affixing the multi-washer component (60).

11. The hydraulic assembly according to claim 7, further comprising connecting pins (56) disposed on the end surface of the coil housing (52) oriented away from the valve block (8), and a shared electric connecting grid (74) which can be placed onto the connecting pins (56) of the valves (1).

12. The hydraulic assembly according to claim 1, wherein at least some of the bridge pieces (58*a*) are embodied as elastically and/or plastically deformable.

13. The hydraulic assembly according to claim 12, wherein at least some of the bridge pieces (58*b*) have fastening elements such as screw eyelets (64) or stop faces for hold-down elements or ribs that protrude from a control unit housing, which can be fastened to the valve block (8), and that are used for affixing the multi-washer component (60).

14. The hydraulic assembly according to claim 12, further comprising connecting pins (56) disposed on the end surface of the coil housing (52) oriented away from the valve block (8), and a shared electric connecting grid (74) which can be placed onto the connecting pins (56) of the valves (1).

15. The hydraulic assembly according to claim 1, wherein at least some of the bridge pieces (58*b*) have fastening elements such as screw eyelets (64) or stop faces for hold-down elements or ribs that protrude from a control unit housing, which can be fastened to the valve block (8), and that are used for affixing the multi-washer component (60).

16. The hydraulic assembly according to claim 1, further comprising connecting pins (56) disposed on the end surface of the coil housing (52) oriented away from the valve block (8), and a shared electric connecting grid (74) which can be placed onto the connecting pins (56) of the valves (1).

* * * * *